No. 727,217. PATENTED MAY 5, 1903.
L. A. SHEPARD.
BRAKE BEAM.
APPLICATION FILED SEPT. 9, 1902.
NO MODEL. 3 SHEETS—SHEET 1.
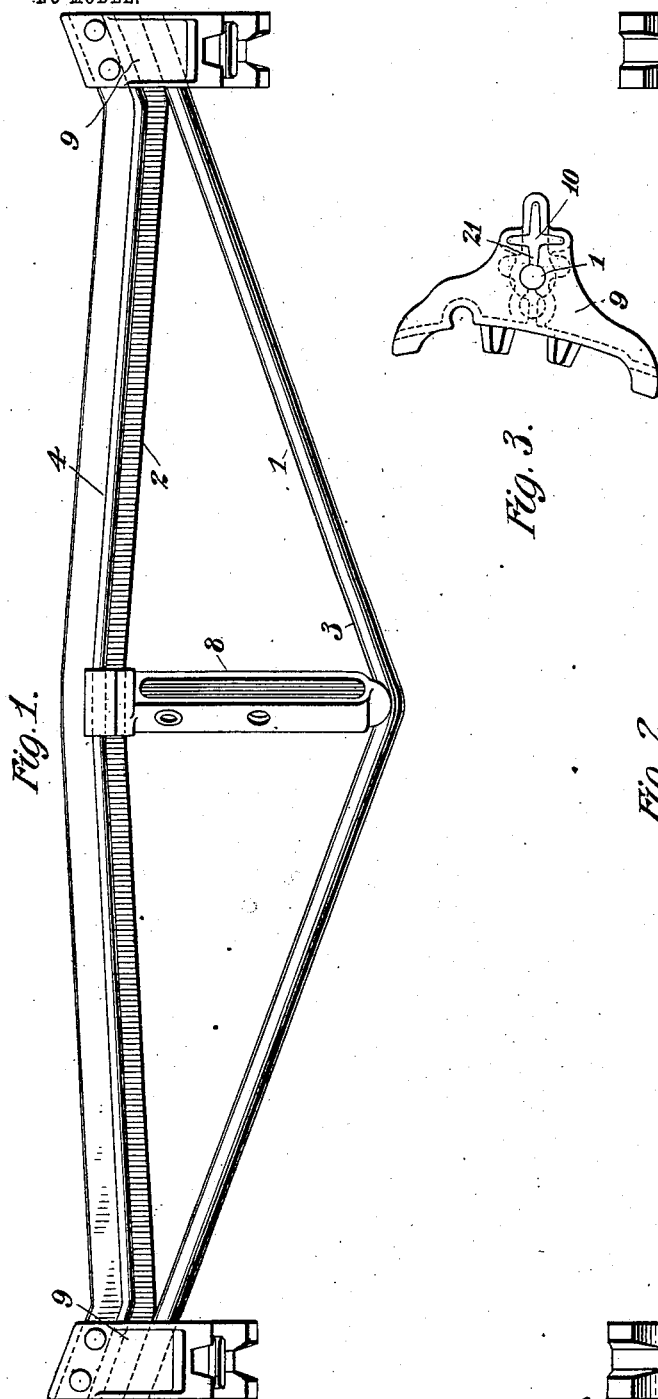
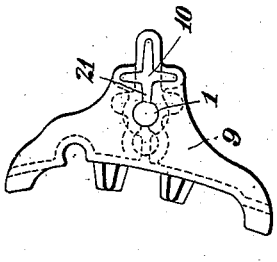
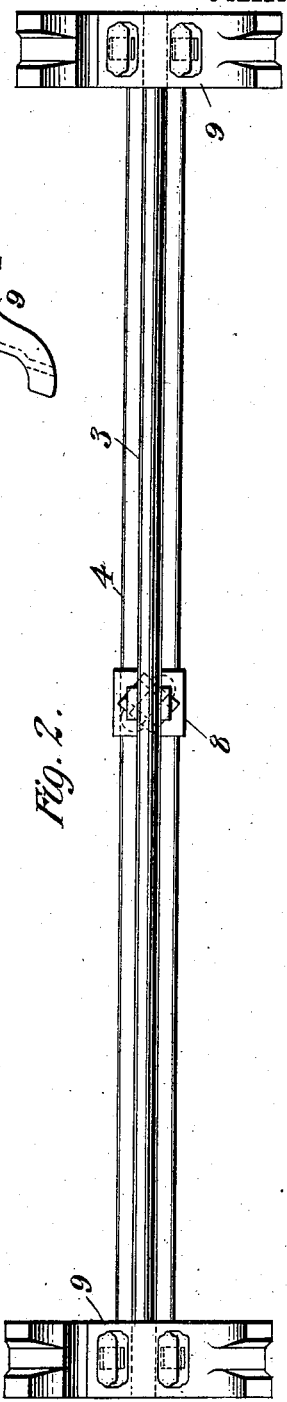

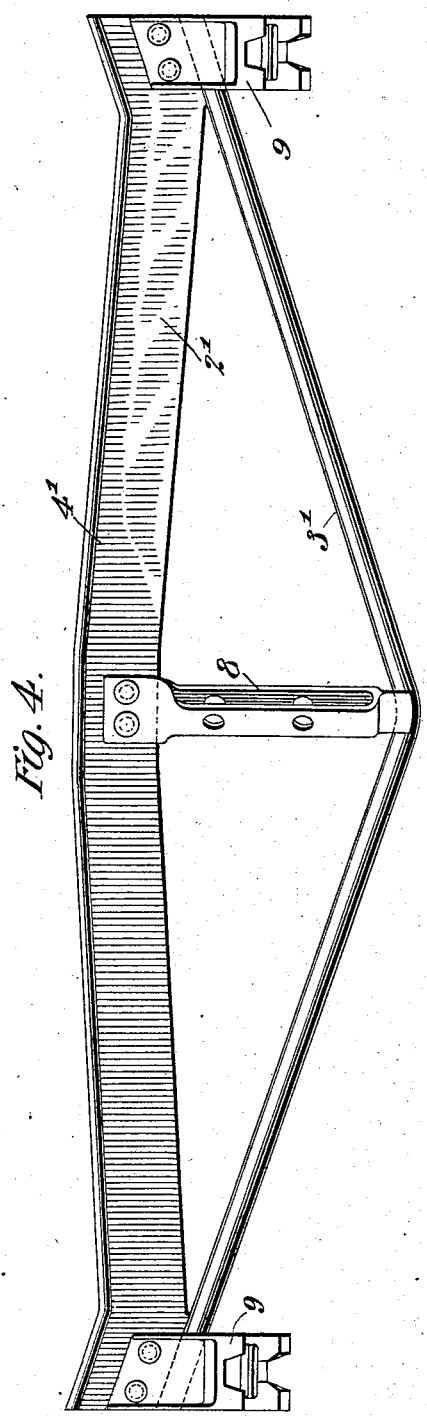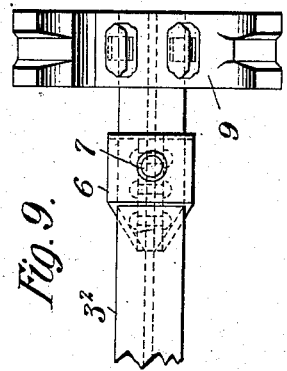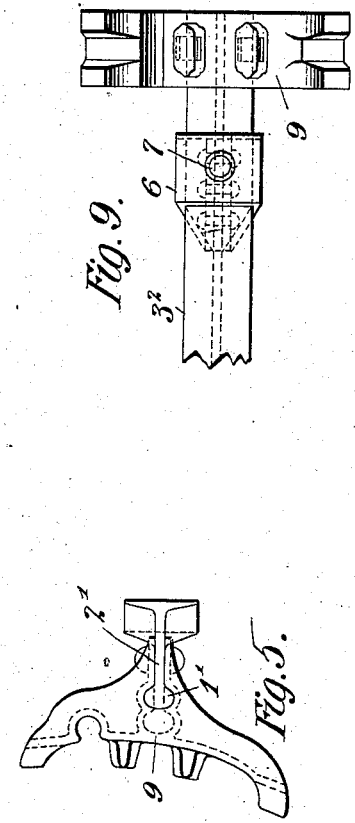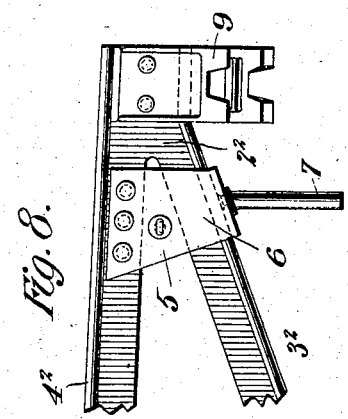

No. 727,217. PATENTED MAY 5, 1903.
L. A. SHEPARD.
BRAKE BEAM.
APPLICATION FILED SEPT. 9, 1902.
NO MODEL. 3 SHEETS—SHEET 3.
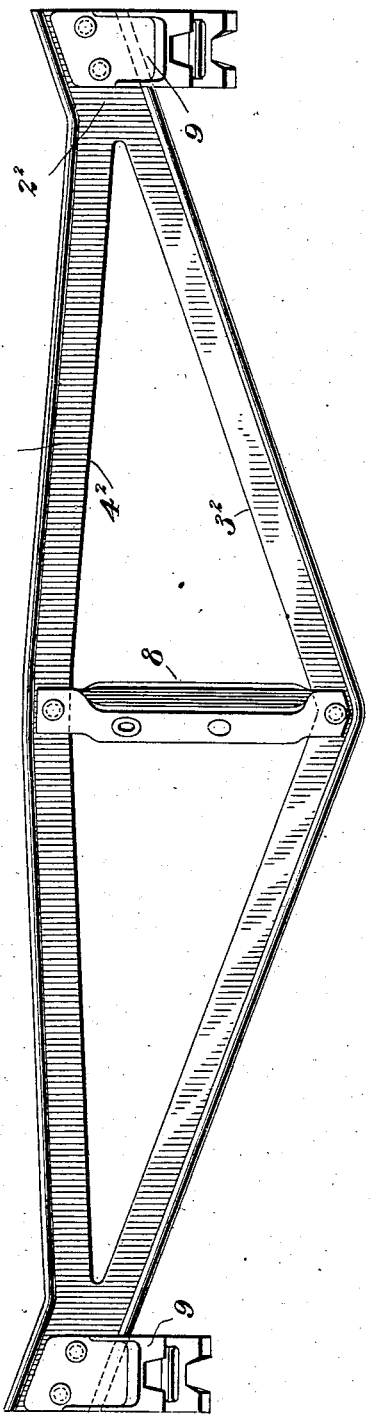
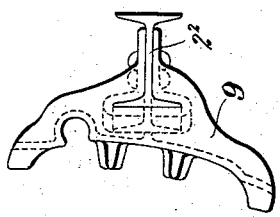

No. 727,217. Patented May 5, 1903.

UNITED STATES PATENT OFFICE.

LOUIS A. SHEPARD, OF BROOKLYN, NEW YORK, ASSIGNOR TO CORNELIUS VANDERBILT, OF NEW YORK, N. Y.

BRAKE-BEAM.

SPECIFICATION forming part of Letters Patent No. 727,217, dated May 5, 1903.

Application filed September 9, 1902. Serial No. 122,670. (No model.)

*To all whom it may concern:*

Be it known that I, LOUIS A. SHEPARD, a citizen of the United States, and a resident of the borough of Brooklyn, city and State of New York, have invented certain new and useful Improvements in Brake-Beams, of which the following is a specification.

My invention relates to an improved form of brake-beam, the structure and advantages of which are fully set forth in the specification and the scope of the invention defined in the appended claims.

It has for its object the production of a brake-beam characterized by great strength and lightness.

In the accompanying drawings, Figure 1 is a plan, Fig. 2 a front view, and Fig. 3 an end view, of one form of my improved brake-beam. Figs. 4 and 5 are respectively plan and end views of an alternative construction. Figs. 6 and 7 are similar views of another alternative form. Figs. 8 and 9 are plan and front views of one end of a third alternative form and show a combined strengthening-plate and wheel-guard attached thereto.

In all of the various forms in which my invention may be embodied the main body of the beam is composed of a single piece of metal, and I may use for this purpose rolled-metal beams having a flange or enlargement at each edge—such as deck-beams, I-beams, &c.—or I may use a beam, as in Figs. 1, 2, and 3, which is of a novel shape invented by me and is well adapted for this purpose. While I prefer to use rolled metal, it is obvious that either pressed or cast metal may be used. The web of the double-flange beam in each case is split longitudinally from a point near one end to a point near the other end of the beam. The two flanges of the beam are then drawn away from each other into the positions shown in Figs. 1, 4, 6, and 8. The fulcrum-block 8 is inserted at the center of the beam. In this manner a truss is formed composed of a compression member, a tension member, and a central strut, the compression and tension members being integral at their ends. The beam is completed by securing at its ends the shoes 9.

In the forms shown in Figs. 1 to 7 the ends of the beams are bent into such a position that the tension member extends in a straight line from the fulcrum 8 to either end of the beam, the ends of the compression member extending in parallelism thereto. These forms have the advantage that the ends of the truss comprising a web and two integral flanges are much less likely to split longitudinally along the web or to bend or break transversely when in use than when the said ends are of the form shown in Figs. 8 and 9. Furthermore, the strength of the truss is increased, since the tensional stresses existing in the tension member are resisted by the bent portions of the web and compression member in the direction of their length.

In Figs. 1 to 3 the cross-section of the beam before it is split is a cross 10, one arm of which terminates in a bulb-like enlargement 1. The web 2 is split along a line adjacent the bulb 1. It is evident, therefore, that the tension member is approximately circular in cross-section and that a section of the compression member 4 is a cross. The vertical flanges of the compression member are advantageous not only in stiffening and strengthening the same, but may also be made use of in securing the fulcrum.

In the beam shown in Figs. 4 and 5 the split beam is a deck-beam. (See Fig. 5.) The web 2' is split along a line adjacent the bulb 1' and forms a tension member 3', approximately circular in cross-section, and a compression member 4', which is T-shaped in section.

In the beams of Figs. 6, 7, 8, and 9 an I-beam is used, and its web $2^2$ is split along its center, thereby forming tension and compression members $3^2$ and $4^2$, which are T-shaped in section—that is, each is in itself a flanged beam.

In order to prevent the splitting or cracking of the beam at its ends, I may secure thereto a piece 5. This piece may be of any form whatever. In the form which I have shown it comprises a U-shaped portion 6, surrounding the tension member and riveted to the web of the compression member. A wheel-guard 7 is secured to the portion 6. Although the piece 5 is shown as secured to only one of the beams illustrated, it is evident that it may readily be applied to any of the other beams.

It will be seen that the brake-beams shown are very strong, light, and durable. The fact that they are trusses enables them to be made from very light beams, and yet be possessed of sufficient strength. The compression member in each case is a flanged beam. There is no possibility of any loosening up of any of the members of the truss, as the compression and tension members are integral at their ends. The fact that the split beams may be made from ordinary commercial rolled metal insures an inexpensive beam which may be easily and quickly constructed. The bending of the ends of the beams (shown in Figs. 1 to 7) renders the beams stronger and more serviceable than they would otherwise be.

Having thus described my invention, what I claim, and desire to secure by Letters Patent, is—

1. A rolled-metal beam whose cross-section is the shape of a cross, one of the arms of said cross being of sufficient depth to form a web or flange, and terminating in a bulb-like enlargement, substantially as described.

2. A trussed brake-beam comprising a compression member, a tension member and a central strut, said tension member being bent at its center and extending therefrom in straight lines to its ends, the ends of said compression member being bent into parallelism with said tension member and being integral therewith, substantially as described.

3. A trussed brake-beam, comprising a flanged compression member, a tension member, and a central strut, said tension member being bent at its center and extending therefrom in straight lines to its ends, the ends of said compression member being bent into parallelism with said tension member and being integral therewith, substantially as described.

4. A trussed brake-beam comprising a flanged compression member, a tension member approximately circular in cross-section and a central strut, said tension member being bent at its center and extending therefrom in straight lines to its ends, the ends of said compression member being bent into parallelism with said tension member and being united thereto, substantially as described.

5. A trussed brake-beam comprising a compression member whose cross-section is a cross, a tension member approximately circular in cross-section and a central strut, said tension member being bent at its center and extending therefrom in straight lines to its ends, the ends of said compression member being bent into parallelism with said tension member and being united thereto, substantially as described.

6. A trussed brake-beam, comprising a horizontally-flanged compression member whose cross-section is a cross, a tension member integral with one of the horizontal flanges thereof, and a strut, substantially as described.

7. A trussed brake-beam, comprising a compression member, having a vertical flange and an inwardly-extending horizontal web, a tension member approximately circular in cross-section, and a strut, substantially as described.

8. A trussed brake-beam, comprising a compression member, a tension member integral therewith, a strut, and a piece secured to said tension and compression members near their ends, to prevent splitting, substantially as described.

9. A trussed brake-beam comprising a beam longitudinally divided intermediate its ends, a central strut between the separated portions of said beam, and a piece secured to said separated portions near their ends to prevent splitting, substantially as described.

10. A trussed brake-beam, comprising a compression member, a tension member integral therewith, a strut, and a piece secured to said tension and compression members near their ends, to prevent splitting, said piece carrying a projecting wheel-guard, substantially as described.

In witness whereof I have hereunto set my hand this 8th day of September, 1902.

LOUIS A. SHEPARD.

In presence of—
WILLIAM KENT AUCHINCLOSS,
JAMES J. COSGROVE.